United States Patent [19]

Kraina

[11] 3,896,617
[45] July 29, 1975

[54] STEERING SYSTEM WITH ELECTRICALLY DRIVEN SECONDARY STEERING MEANS

[75] Inventor: Jack H. Kraina, Aura, Ill.

[73] Assignee: Caterpillar Tractor Co., Peoria, Ill.

[22] Filed: Nov. 1, 1973

[21] Appl. No.: 411,775

[52] U.S. Cl. ............... 60/403; 60/405; 60/486; 60/DIG. 2; 180/79.2 R
[51] Int. Cl. .................. F15b 20/00; B62d 5/06
[58] Field of Search ............ 60/405, 400, 402, 403, 60/486, DIG. 2

[56] References Cited
UNITED STATES PATENTS

| | | | |
|---|---|---|---|
| 2,954,671 | 10/1960 | Kress | 60/405 |
| 3,280,557 | 10/1966 | Sattavara | 60/405 |
| 3,434,282 | 2/1969 | Shelhart | 60/405 |

*Primary Examiner*—Edgar W. Geoghegan
*Assistant Examiner*—Wm. Woods
*Attorney, Agent, or Firm*—Phillips, Moore, Weissenberger, Lempio & Strabala

[57] ABSTRACT

A steering system for an articulated vehicle including a primary engine driven pump having associated fluid communication means for delivering hydraulic fluid to steering motor means. A secondary back-up system having separate electrically driven pumping means and fluid communication means for delivering hydraulic fluid to the steering motor means upon failure of the primary delivery system. Manual switching means for energizing the secondary system. Separate control valves for the primary steering system and the secondary steering system and mechanical linkage means between said primary and secondary valves for concurrent actuation thereof upon movement of the mechanical linkage means.

10 Claims, 1 Drawing Figure

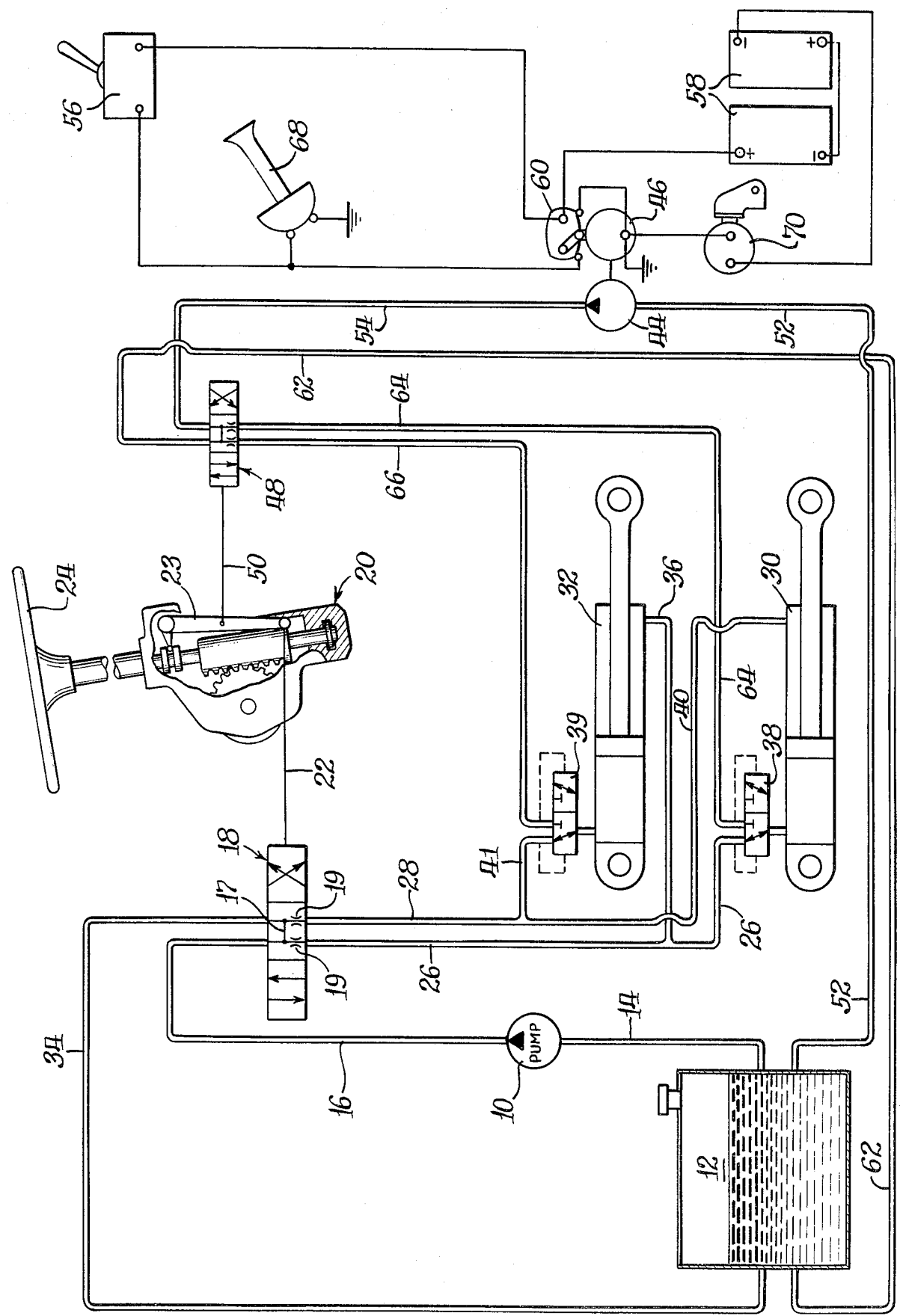

STEERING SYSTEM WITH ELECTRICALLY DRIVEN SECONDARY STEERING MEANS

BACKGROUND OF THE INVENTION

Heavy duty earth moving vehicles, particularly articulated wheel tractors, often have demanding steering requirements. A major concern with regard to such vehicles has been the provision of alternate means for steering upon a failure in the primary steering system. Loss of control of such a vehicle, usually by virtue of a hydraulic failure in the primary steering system, can be extremely hazardous especially if the vehicle is operating in rough or hilly terrain such as that frequently encountered by log skidder vehicles.

Some attempts to provide a secondary or emergency steering system for articulated vehicles have involved the use of auxiliary pumps driven from a separate power source, such as an electric supply, to supply hydraulic fluid to the steering motors in the event of failure of principle pumping means.

Examples of electrically driven secondary steering pump systems which are automatically actuated in the event of a failure of the primary steering system are provided by U.S. Pat. Nos. 2,954,671 and 3,280,557.

One of the obvious disadvantages of prior art emergency steering systems has been that, upon a failure in the hydraulic conduit system leading to the steering motors from the primary pumping means, the resultant loss of fluid could be such that even an electrically driven secondary pump could not provide steering fluid to the motors.

Another problem has been that, in the event of such a failure in the conduit system, a drainage of the hydraulic fluid reservoir could occur by virtue of its disposition at a higher elevation than the primary pump or the fluid communication means leading to the hydraulic steering motors.

SUMMARY AND OBJECTS OF THE INVENTION

The instant invention provides a combined primary and secondary steering system for articulated vehicles. The primary steering system is provided with an engine driven primary pump means and primary fluid communication means and control means for transmitting hydraulic fluid under pressure to hydraulic fluid motor means for steering the vehicle. The secondary or emergency steering system comprises a manually energized electrically driven fluid pump means and separate secondary fluid communication means and control means for transmitting fluid to the hydraulic steering motors in the event of a failure in the primary system or when desired for other purposes upon actuation of manual energization means. Both the control means for the primary system and for the secondary system are mechanically linked through a manually actuated steering mechanism for concurrent movement. The source of supply for both the primary steering circuit and the secondary steering circuit is disposed at an elevation lower than that of the inlets of the primary and secondary pumping means so that upon failure of the hydraulic fluid communication means of either circuit, sufficient fluid will remain in the source of supply for a steering capability.

The main object of the present invention is to provide a relatively fail-safe emergency and secondary steering system which does not depend upon the vehicle prime mover for its operation and which will effectively provide steering control despite a breakage of the hydraulic fluid communication means in the primary steering circuit with consequent fluid leakage.

Other objects and advantages of the present invention will become apparent from the following description and drawing.

BRIEF DESCRIPTION OF THE DRAWING

The sole FIGURE is a schematic representation of the fluid circuitry and components of the primary and secondary steering system embodying the principles of the present invention.

DETAILED DESCRIPTION

With reference to the drawing, the circuitry and components of the present invention may be appreciated. The primary system includes a rotary hydraulic pump 10 which is driven by the engine of the articulated vehicle. The source of hydraulic fluid is represented schematically by the sump 12. The pump draws fluid from the sump through a conduit 14 and discharges fluid through an outlet conduit 16 to a primary steering valve represented generally at 18. The primary steering valve 18 is directly connected by means of a primary link means 22 to a conventional manually actuated rack and pinion steering mechanism shown generally at 20. Steerage of the vehicle is accomplished by manual actuation of a conventional steering wheel 24 in the known manner.

Steering valve 18 is equipped with passage means 17 and conduit means 34 for by-passing fluid entering the valve 18 from the conduit 16 back to the sump 12 under certain conditions when the valve 18 is disposed as presently shown in the drawing. A pair of conduits 26 and 28 are provided for transmitting hydraulic flow from the valve 18 to and from a pair of reciprocating hydraulic fluid motors 30 and 32 which are connected between the frames of the articulated vehicle for steerage thereof. As mentioned, with the valve 18 positioned as shown, fluid is by-passed through the passage 17 back to the sump 12. At such time, to prevent the fluid motors 30 and 32 from collapsing under the influence of forces exerted by the vehicle wheels, a pair of internal restrictions 19 are provided in the valve 18 to restrict return flow from the conduits 26 and 28.

Normal steering of the vehicle is accomplished by means of the simple rotation of the steering wheel 24. Such movement is transmitted through the crank member 23 to the primary link means 22 for actuation of the steering valve 18. When the valve 18 moves to the right, as shown in the drawing, fluid from the pump 10 will be directed to the conduit 26 to the head end of the cylinder 30 via pressure shiftable double valves 38. Concurrently, fluid from the conduit 26 will flow through the line 36 to the rod end of the cylinder 32. Fluid exhausted from the opposite ends of each of the cylinders 30 and 32 will pass through the conduits 40 and 41 to the return conduit 28 for passage back to the sump 12 via the conduit 34.

Movement of the primary steering control valve 18 toward the left as shown in the drawing will direct the pressurized fluid through the conduit 28 to the head end of the cylinder 32 and to the rod end of the cylinder 30 via the conduits 41 and 40 respectively. Fluid exhausted from the opposite ends of each cylinder will be returned to the sump 12 via the conduits 36, 26 and 34.

The secondary or emergency steering system includes a rotary hydraulic fluid pump 44 which is driven by an electric motor 46. A secondary steering control valve 48 is also provided for actuation similar to that of the primary control valve 18. Like the control valve 18, the valve 48 is connected by secondary link means 50 directly to the crank 23 of the steering mechanism 20. As is apparent from the drawing, any movements transmitted to the crank 23 will concurrently be transmitted to both valves 18 and 48. When activated, the secondary pump 44 draws hydraulic fluid from the sump 12 through a separate secondary conduit means 52 and discharges fluid through a secondary conduit means 54 to the valve 48. Return and by-passed fluid from the secondary system passes back to the sump 12 through a separate secondary drain conduit means 62.

The pump 44, which is normally inoperative, is energized by means of a manually operated switch 56 which causes energization of the motor 46 when desired by the vehicle operator. When the switch 56 is closed, an electric circuit through the batteries 58 and the electric motor 46 and including a relay 60 is energized and the pump 44 becomes operative. In operation, the pump 44 supplies fluid to the valve 48 which, in the position shown, corresponds to a static steer condition wherein fluid is by-passed through the valve 48 back to the sump 12 via the line 62.

Upon manual actuation of the steering mechanism 20 to shift the valve 48 toward the right, as shown in the drawing, fluid will be directed from the conduit means 54 to the head end of the cylinder 30 via the conduit means 64 and pressure actuated double valves 38. The capacity of the pump 44 is preferably somewhat less than that of the pump 10. Fluid exhausted from the rod end of the cylinder 30 and from the head end of the cylinder 32 will pass respectively through the lines 40, 28, and 34 back to the sump 12 and through lines 66 and 62 back to the sump 12. It should be noted that when the valve 48 is shifted to the right, the valve 18 is also shifted to the right via the steering mechanism 20 and primary link means 22. Turning the steering wheel 24 in the opposite direction shifts the valve 48 to the left and causes the direction of fluid to the head end of the cylinder 32 via the conduits 66 and pressure actuated double valves 39.

Under normal conditions when the primary steering system is fully operative, pressure in the conduits 26 and 28 is sufficient to shift the double valves 38 and 39 to a position which blocks fluid to and from the conduits 64 and 66. Conversely, when the auxiliary pump 44 is operating, pressure in the conduits 64 and 66 is sufficient to cause the valves 38 and 39 to shift leftwardly to a position which would block flow through the valves from the conduit means 26 and 41 to prevent back flow and loss of fluid.

Two of the most commonly encountered failures in the primary hydraulic fluid steering system are remedied by the instant invention. In the case of an engine failure which could render the pump 10 inoperative, the storage batteries 58 would have sufficient reserve power to operate the pump 44 for several minutes. In a like manner, in the event of a hydraulic fluid conduit means failure which would normally cause the loss of large quantities of hydraulic fluid, sufficient fluid would be retained for the secondary pump 44 by virtue of the placement of the sump 12 substantially lower in elevation than the inlets for the pumps 44 and 10. In this regard, as previously mentioned, double valves 38 and 39 are operative to prevent back flow and fluid loss through a broken line or connection.

A warning means, preferably a horn 68, is provided in the electrical circuitry for the auxiliary pumping system and is adapted to sound at any time the electric motor operates. To prevent accidental energization of the motor 46, a key operated disconnect switch 70 is provided.

While the invention has been described with particular reference to the preferred embodiments, it is apparent that variations and modifications are possible within the purview of the inventive concepts. No limitation with respect to such variations and modifications is intended, except by the scope of the appended claims.

I claim:

1. A steering system for an earthmoving vehicle comprising; hydraulic fluid supply means, primary pump means, primary fluid communication means including first conduit means for connecting said supply means and said primary pump means, steering motor means, said primary fluid communication means further including second conduit means for connecting said primary pump means to said steering motor means, primary control valve means in said conduit means between said primary pump means and said motor means for controlling the flow of hydraulic fluid to and from said motor means, steering mechanism means for selectively actuating said primary control valve means, selectively manually activated and deactivated secondary pump means, means for selectively manually activating and deactivating said secondary pump means, secondary communication means including third conduit means for connecting said secondary pump means to said fluid supply means, said secondary communication means further including separate fourth conduit means for connecting said secondary pump means to said steering motor means, secondary control valve means in said separate conduit means for controlling the flow of hydraulic fluid to and from said motor means upon selective manual activation and deactivation of said secondary pump means.

2. The invention of claim 1 wherein said steering mechanism means includes primary and secondary link means connected to said primary control valve means and said secondary control valve means respectively for concurrent actuation of said primary and secondary control valve means by said steering mechanism means.

3. The invention of claim 1 wherein said manually activated secondary pump means include a fluid pump and an electric motor for driving said pump, said secondary pump means further including a manually actuated switching means for selectively manually activating said electric motor and said fluid pump.

4. The invention of claim 3 further including alarm means operative upon activation of said electric motor for signalling the operation of said secondary pump means.

5. The invention of claim 1 wherein said primary and secondary fluid communication means further include pressure responsive valve means communicating with said steering motor means and with said second and fourth conduit means for automatically blocking fluid flow in a portion of said fourth conduit means when said primary pump means is operative to drive said steering motor means and for blocking fluid flow in a portion of said second conduit means when said secondary pump means is operative.

6. The invention of claim 1 wherein said primary control valve means include a spool valve having first, second and third sequential positions, said spool valve operative to by-pass fluid from said primary pump means to said fluid supply means in said second position.

7. The invention of claim 6 wherein said secondary control valve means include a second spool valve having first, second and third positions.

8. The invention of claim 6 wherein said spool valve includes restriction means for retarding the flow of fluid through said valve when said valve is disposed in said second position.

9. The invention of claim 1 wherein said steering motor means include first and second reciprocating double acting piston type hydraulic fluid motors.

10. The invention of claim 3 further including manually actuated lockable disconnect switch means for selectively preventing the activation of said switching means.

* * * * *